United States Patent
Baba et al.

(10) Patent No.: US 10,379,303 B2
(45) Date of Patent: Aug. 13, 2019

(54) OPTICAL MODULE AND METHOD FOR ALIGNING OPTICAL MODULE

(71) Applicant: Oclaro Japan, Inc., Sagamihara, Kanagawa (JP)

(72) Inventors: Naohiko Baba, Tokyo (JP); Hiroshi Yamamoto, Tokyo (JP); Tomonao Kikuchi, Kanagawa (JP); Yasuhiro Yamada, Kanagawa (JP)

(73) Assignee: Oclaro Japan, Inc., Kanagawa (JP)

(*) Notice: Subject to any disclaimer, the term of this patent is extended or adjusted under 35 U.S.C. 154(b) by 1 day.

(21) Appl. No.: 15/465,923

(22) Filed: Mar. 22, 2017

(65) Prior Publication Data

US 2017/0276889 A1  Sep. 28, 2017

(30) Foreign Application Priority Data

Mar. 28, 2016 (JP) .................................. 2016-063802

(51) Int. Cl.
*G02B 6/42* (2006.01)
*G02B 6/32* (2006.01)

(52) U.S. Cl.
CPC ............. *G02B 6/4256* (2013.01); *G02B 6/32* (2013.01); *G02B 6/421* (2013.01); *G02B 6/424* (2013.01);
(Continued)

(58) Field of Classification Search
CPC .... G02B 6/4245; G02B 6/4256; G02B 6/421; G02B 6/4215
See application file for complete search history.

(56) References Cited

U.S. PATENT DOCUMENTS 6,409,398 B2 * 6/2002 Nakaya ............... G02B 6/4204
                                                        385/33
7,059,780 B2 * 6/2006 Yamabayashi ......... G02B 6/421
                                                        385/88
(Continued)

FOREIGN PATENT DOCUMENTS

CN    102162915 A    8/2011
CN    103955030 A    7/2014
(Continued)

OTHER PUBLICATIONS

Chinese Office Action received in corresponding Chinese Application No. 201710188087.3 dated Aug. 1, 2018.

*Primary Examiner* — Chris H Chu
(74) *Attorney, Agent, or Firm* — Mattingly & Malur, PC

(57) ABSTRACT

To provide an optical module and a method for aligning the optical module with which alignment can be easily performed. An optical module includes first optical element sections and a second optical element section optically joined to the first optical element sections. Each first optical element section includes an optical conversion element, a ferrule having a distal end being in contact with and optically joined to the second optical element section, and a first optical system disposed in a position where the ferrule and the optical conversion element are optically adjusted. The second optical element section includes joining sections in contact with and joined to, in joining parts, the distal ends of the ferrules, a wavelength multiplexing optical element optically joined to the optical conversion elements, and second optical systems respectively disposed in positions where the wavelength multiplexing optical elements and the joining parts are optically adjusted.

10 Claims, 6 Drawing Sheets

(52) U.S. Cl.
CPC ......... *G02B 6/4215* (2013.01); *G02B 6/4292* (2013.01); *G02B 6/4245* (2013.01); *G02B 6/4263* (2013.01)

(56) References Cited

U.S. PATENT DOCUMENTS

| | | | |
|---|---|---|---|
| 7,090,412 B2* | 8/2006 | Kato | G02B 6/4292 |
| | | | 385/88 |
| 7,322,752 B2* | 1/2008 | Endou | G02B 6/4206 |
| | | | 385/88 |
| 9,455,786 B2* | 9/2016 | Liao | G02B 6/4246 |
| 2002/0168153 A1 | 11/2002 | Yamabayashi et al. | |
| 2010/0061730 A1* | 3/2010 | Seki | G02B 6/4246 |
| | | | 398/79 |

FOREIGN PATENT DOCUMENTS

| | | |
|---|---|---|
| JP | 2010-061139 A | 3/2010 |
| JP | 2013-232514 A | 11/2013 |

* cited by examiner

OPTICAL MODULE AND METHOD FOR ALIGNING OPTICAL MODULE

CROSS-REFERENCE TO RELATED APPLICATION

The present application claims priority from Japanese application JP 2016-063802, filed on Mar. 28, 2016, the content of which is hereby incorporated by reference into this application.

BACKGROUND OF THE INVENTION

1. Field of the Invention

The present invention relates to an optical module and a method for aligning the optical module and, more particularly, to a technique related to optical wavelength multiplexing communication.

2. Description of the Related Art

In recent years, WDM (Wavelength Division Multiplexing) of an optical module has been demanded. JP 2013-232514 A discloses an optical module that enables high-density packaging in a small optical transceiver for WDM. A TOSA 30 described in FIG. 6 of JP 2013-232514 A includes a TOSA base 31, four CAN packages 32A to 32D, a plurality of optical components (mirrors, filters, and collimator lenses) set in the TOSA base 31, and a sleeve 33. The mirrors are respectively disposed right under the CAN packages 32A to 32D. Lights pass through the collimator lenses set in optical paths to be changed to parallel lights. The lights are further reflected by the mirrors or the filters and pass the filters according to necessity. The lights (four waves) are combined into wavelength multiplexed light. The wavelength multiplexed light is reflected by the mirrors to change a direction and finally emitted through the sleeve 33.

JP 2010-61139 A discloses an optical module that multiplexes and demultiplexes four-wave multiplexed signals, the optical module increasing an allowable range of alignment accuracy and facilitating aligning work.

SUMMARY OF THE INVENTION

In the TOSA 30 of an optical module 1 described in JP 2013-232514 A, four optical subassemblies (CAN packages 32A to 32D) are used. As explained above, the plurality of optical components are disposed on the inside of the TOSA base 31. There is no particular description in JP 2013-232514 A concerning alignment. However, when the CAN packages 32A to 32D are set on the TOSA base 31, it is considered necessary to align the CAN packages 32A to 32D respectively with respect to multiplexing/demultiplexing filters that multiplex lights. Therefore, a longtime is necessary for assembly work of the TOSA 30 of the optical module 1. Consequently, cost increases.

In an optical module 10 including four optical subassemblies, the optical subassemblies are divided into two sets of two optical subassemblies. Alignment can be independently performed in the respective sets. However, as shown in FIG. 1 of JP 2010-61139 A, in the sets, an optical axis of one optical subassembly and an optical axis of the other optical subassembly are arranged to cross at 90 degrees. The optical module 10 has complicated structure in which a large number of optical components are necessary. As a result, a reduction in size is hindered.

The present invention has been devised in view of such problems and an object of the present invention is to provide an optical module and a method for aligning the optical module with which alignment can be easily performed.

(1) In order to solve the problems, an optical module according to the present invention includes: a plurality of first optical element sections; and a second optical element section optically joined to the respective plurality of first optical element sections. Each of the plurality of first optical element sections includes: an optical conversion element that converts one of an optical signal and an electric signal into the other; a ferrule, having a distal end being in contact with and optically joined to the second optical element section; and a first optical system disposed in a position where the ferrule and the optical conversion element are optically adjusted. The second optical element section includes: a plurality of joining sections; a wavelength multiplexing optical element; and a plurality of second optical systems. Each of the plurality of joining sections is in contact with and joined to, in a joining part, the distal end of the ferrule of the corresponding first optical element section. The wavelength multiplexing optical element is optically joined to the optical conversion elements of the plurality of first optical element sections. Each of the plurality of second optical systems is disposed in a position where the wavelength multiplexing optical element and the joining part of the corresponding joining section are optically adjusted.

(2) In the optical module described in (1) above, the optical conversion elements of the respective plurality of first optical element sections may include light emitting elements that convert the electric signal into the optical signal.

(3) In the optical module described in (1) above, the optical conversion elements of the respective plurality of first optical element sections may include light receiving elements that convert the optical signal into the electric signal.

(4) In the optical module described in any one of (1) to (3) above, the respective plurality of second optical systems of the second optical element section may include convex lenses.

(5) In the optical module described in any one of (1) to (4) above, the plurality of first optical element sections may include four first optical element sections, and the plurality of joining sections of the second optical element section may include four joining sections.

(6) In the optical module described in (5) above, the four joining sections may be arranged two by two.

(7) In the optical module described in (1) to (6) above, the respective plurality of joining sections may include sleeve mechanisms.

(8) A method for aligning an optical module according to the present invention is a method for aligning an optical module including a plurality of first optical element sections and a second optical element section optically joined to the respective plurality of first optical element sections. Each of the plurality of first optical element sections include: an optical conversion element that converts one of an optical signal and an electric signal into the other; a ferrule having a distal end being in contact with and optically joined to the second optical element section; and a first optical system for optically joining the ferrule and the optical conversion element. The second optical element section includes: a plurality of joining sections; a wavelength multiplexing optical element; and a plurality of second optical systems. Each of the plurality of joining sections is in contact with and joined to, in a joining part, the distal end of the ferrule of the corresponding first optical element section. The wavelength multiplexing optical element is optically joined to the optical conversion elements of the plurality of first optical element section. Each of the plurality of second optical systems is for optically joining the wavelength multiplexing optical elements and the joining parts of the plurality of joining sections. The method includes: a first-optical-element-section aligning step for aligning one first optical element section among the plurality of first optical element sections; and a second-optical-element-section aligning step for aligning the second optical element section. The first-optical-element-section aligning step includes: a step for connecting, to the one first optical element section, a first optical device for alignment including a first connection terminal in contact with and joined to the distal end of the ferrule of the one first optical element section; and a step for adjusting a position(s) of one or both of the optical conversion element of the one first optical element section and the first optical system. The second-optical-element-section aligning step includes: a step for connecting, to one joining section among the plurality of joining sections of the second optical element section, a second optical device for alignment including a second connection terminal in contact with and joined to the one joining section; and a step for adjusting a position(s) of one or both of one second optical system corresponding to the one joining section among the plurality of second optical systems and the wavelength multiplexing optical element.

According to the present invention, an optical module and a method for aligning the optical module with which alignment can be easily performed are provided.

DETAILED DESCRIPTION OF THE INVENTION

Figure 1:
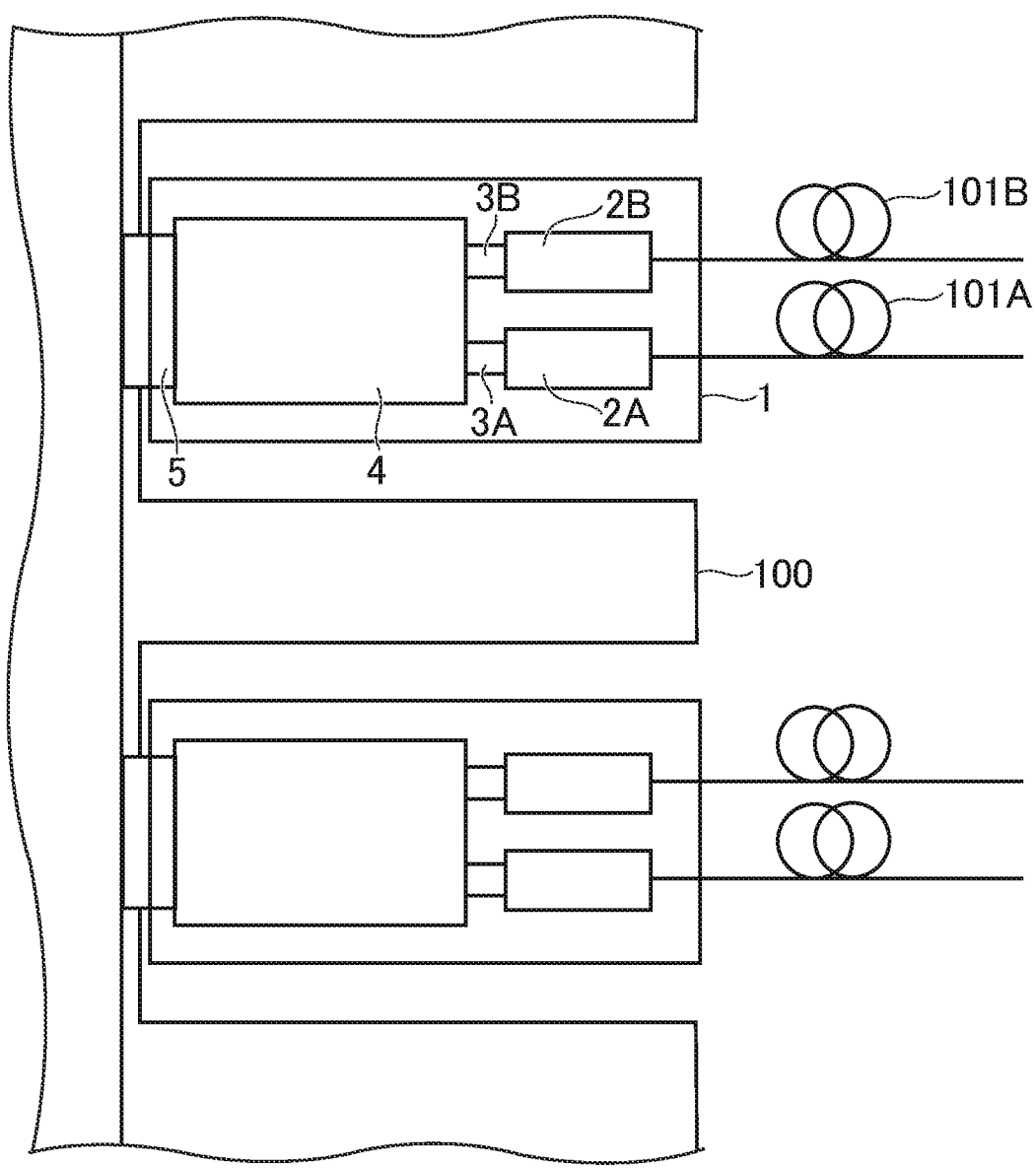
FIG. 1 is a schematic diagram showing the configuration of an optical module according to a first embodiment of the present invention.

Embodiments of the present invention are explained specifically and in detail below with reference to the drawings. Note that, in all views for explaining the embodiments, members having the same functions are denoted by the same reference numerals and signs and redundant explanation of the members is omitted. Note that the figures referred to below are only figures for explaining examples of the embodiments. The sizes of the figures and scales described in the embodiments do not always coincide with each other.

First Embodiment

FIG. 1 is a schematic diagram showing the configuration of an optical module 1 according to a first embodiment of the present invention. The optical module 1 according to the embodiment is a transceiver including a function of optical transmitting and a function of optical receiving. The optical module 1 includes an optical transmitter module 2A, an optical receiver module 2B, flexible boards 3A and 3B, a printed circuit board 4, and an electric connector 5.

A plurality of optical modules 1 are connected to a transmission device 100 respectively by electric connectors 5. The transmission device 100 is, for example, a large-capacity router or switch. The transmission device 100 includes, for example, a function of a switchboard and is disposed in a base station or the like. The transmission device 100 acquires reception data (an electric signal for reception) from the optical module 1, determines which data is transmitted to where, generates transmission data (an electric signal for transmission), and transmits the transmission data to the relevant optical module 1.

The optical transmitter module 2A of the optical module 1 converts the electric signal for transmission into a wavelength multiplexed optical signal and transmits the wavelength multiplexed optical signal to an optical fiber 101A. The optical receiver module 2B of the optical module 1 converts the wavelength multiplexed optical signal received via an optical fiber 101B into the electric signal for reception. The printed circuit board 4 and the optical transmitter module 2A and the optical receiver module 2B are respectively connected via the flexible boards 3A and 3B. The electric signal for transmission is transmitted from the printed circuit board 4 to the optical transmitter module 2A via the flexible board 3A. The electric signal for reception is transmitted from the optical receiver module 2B to the printed circuit board 4 via the flexible board 3B.

The transmission system according to this embodiment includes two or more optical modules 1, two or more transmission devices 100, and one or more optical fibers 101. One or more optical modules 1 are connected to the transmission devices 100. The optical fiber 101 connects the optical modules 1 respectively connected to two transmission devices 100. Transmission data generated by one transmission device 100 is converted into an optical signal by the optical module 1 connected to the transmission device 100. The optical signal is transmitted to the optical fiber 101. The optical signal transmitted on the optical fiber 101 is received by the optical module 1 connected to the other transmission device 100. The optical module 1 converts the optical signal into an electric signal and transmits the electric signal to the other transmission device 100 as reception data.

The optical module 1 according to the embodiment is an optical module having a bit rate of a 100 Gbit/s class and is optimum for a CFP system and QSFP28 (MSA standards). In the CFP system or the QSFP28, the optical module 1 has four channels for transmission (the optical transmitter module 2A) and has four channels for reception (the optical receiver module 2B). Both of the four channels for transmission and the four channels for reception are used for a WDM application. A bit rate of electric signals transmitted in the respective channels is any one of 25 Gbit/s to 28 Gbit/s.

Figure 2:
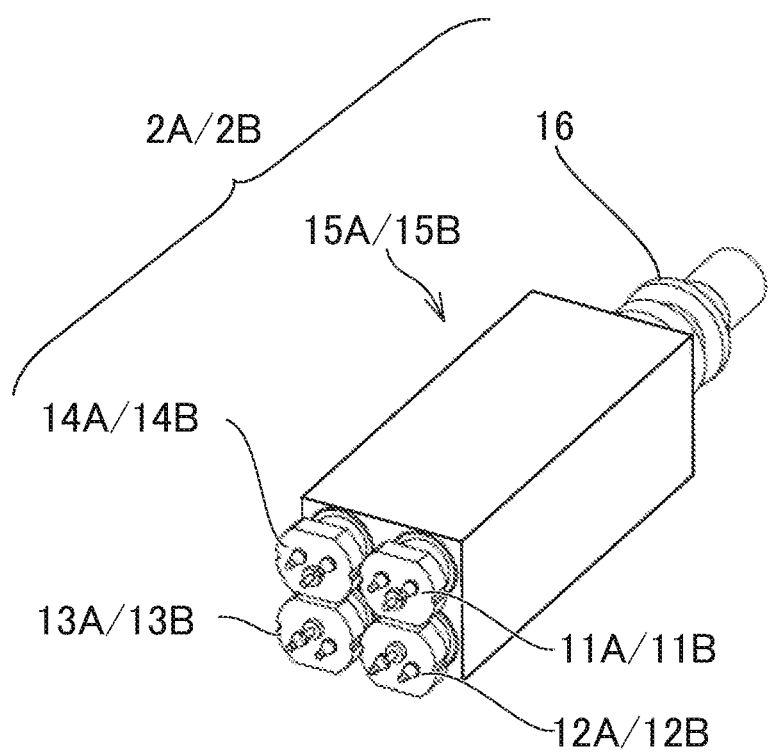
FIG. 2 is a schematic perspective view showing the configuration of an optical transmitter module/an optical receiver module according to the first embodiment of the present invention.

FIG. 2 is a schematic perspective view showing the configuration of the optical transmitter module 2A/the optical receiver module 2B according to the embodiment. The optical transmitter module 2A is explained below. The optical transmitter module 2A according to the embodiment includes a plurality of first optical element sections and a second optical element section. Here, the plurality of first optical element sections are four LD (Laser Diode) modules 11A, 12A, 13A, and 14A. Here, the second optical element section is an optical MUX (Multiplexer) module 15A. The optical MUX module 15A incorporates a light multiplexing function of the optical transmitter module 2A and includes a sleeve assembly 16 for connecting light to be multiplexed (a wavelength multiplexed optical signal) to the optical fiber 101A on the outside. The four LD modules 11A, 12A, 13A, and 14A respectively emit optical signals having wavelengths different from one another. For example, in a CWDM application, the four LD modules 11A, 12A, 13A, and 14A respectively emit optical signals having light wavelengths in four wavelength bands, that is, a 1271 nm band, a 1291 nm band, a 1311 nm band, and a 1331 nm band.

Figure 3:
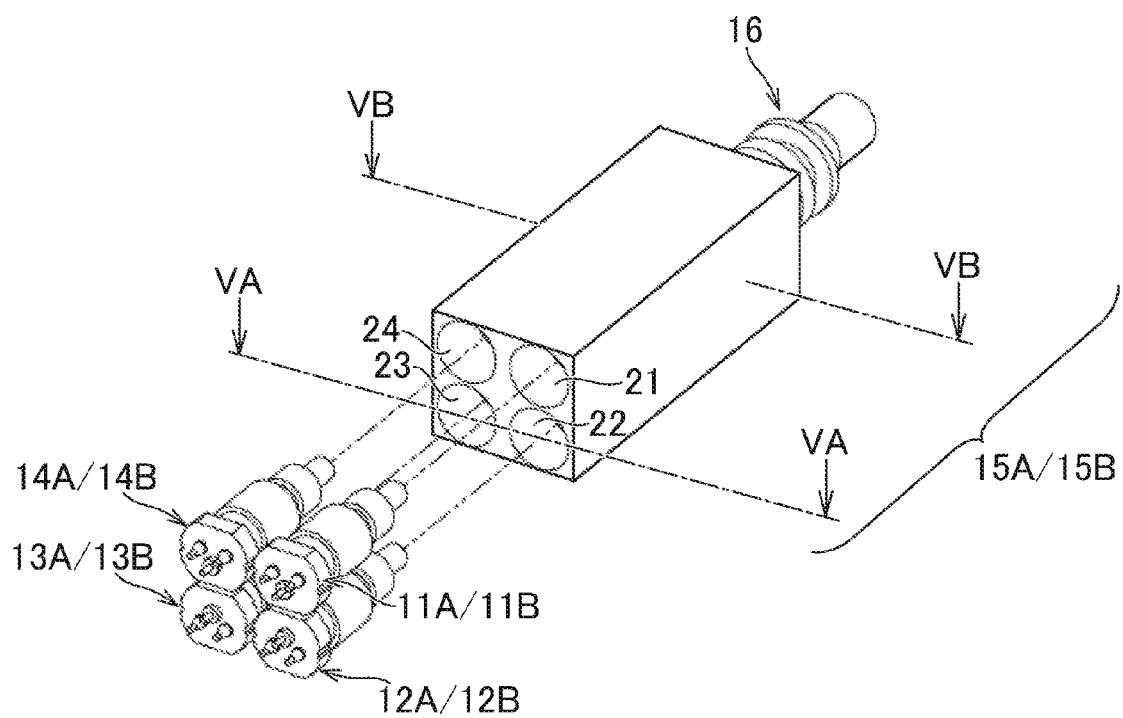
FIG. 3 is a schematic perspective view showing the configuration of the optical transmitter module/the optical receiver module according to the first embodiment of the present invention.

FIG. 3 is a schematic perspective view showing the configuration of the optical transmitter module 2A/the optical receiver module 2B according to the embodiment. FIG. 3 shows a state in which the LD modules 11A, 12A, 13A, and 14A (or PD modules 11B, 12B, 13B, and 14B) are detached from the optical transmitter module 2A (or the optical receiver module 2B) shown in FIG. 2. The optical transmitter module 2A is explained below. As explained below, the respective four LD modules 11A, 12A, 13A, and 14A include ferrules 25. The optical MUX module 15A includes a plurality of joining sections. Each of the plurality of joining sections is in contact with and joined to, in joining a part. a distal end of the ferrule of the corresponding first optical element section. Here, the plurality of joining sections are four setting sections 21, 22, 23, and 24 in contact with and joined to, in the joining parts, the distal ends of the ferrules 25 of the respective four LD modules 11A, 12A, 13A, and 14A. The setting sections include a function of holding and fixing the LD modules.

Figure 4:
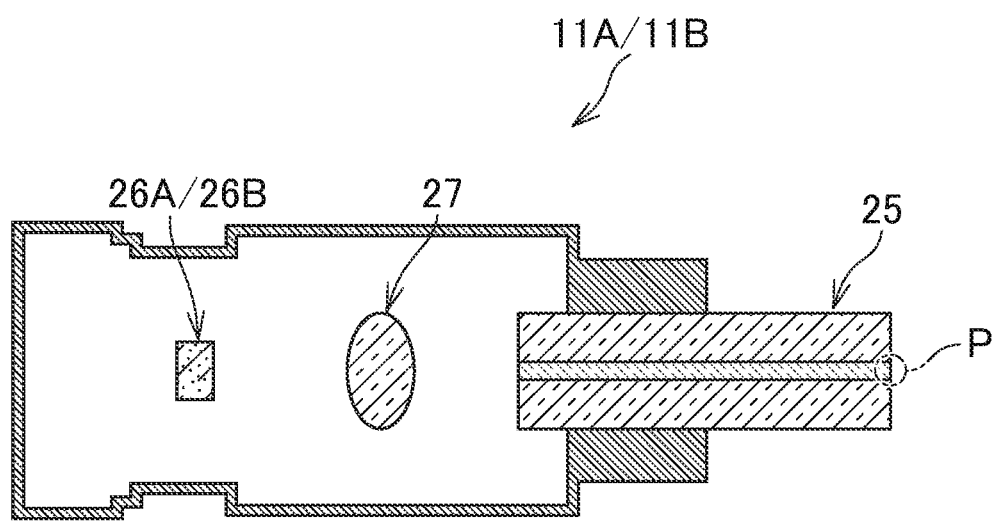
FIG. 4 is a schematic sectional view showing the configuration of an LD module/a PD module according to the first embodiment of the present invention.

FIG. 4 is a schematic sectional view showing the configuration of the LD module 11A/the PD module 11B according to the embodiment. The other LD modules 12A, 13A, and 14A (or the other PD modules 12B, 13B, and 14B) have the same structure. The LD module 11A is explained below. Each of the plurality of first optical element sections includes an optical conversion element, a ferrule, and a first optical systems. Each of the optical conversion elements converts one of an optical signal and an electric signal into the other. Each of the ferrules has a distal end being in contact with and optically joined to the second optical element section. Each of the first optical systems is disposed in a position where the ferrule and the optical conversion elements are optically adjusted. Here, each of the optical conversion elements is a light emitting element that converts the electric signal into the optical signal, and the optical conversion elements are LDs 26A. Here, each of the first optical systems is a condensing lens 27 and is disposed in order to optically join the ferrule and the optical conversion element. Note that, in a simple configuration, the first optical system can be realized by one convex lens. By configuring the first optical system with the one convex lens, a reduction in the size of the first optical element section is realized. However, the first optical system may be another lens component instead of the condensing lens. For example, the first optical system may be an optical system constructed using two collimator lenses.

In general, the ferrule is used to join an optical fiber and an optical fiber. Like the optical fiber, the ferrule includes a core in the center and a clad that covers the circumference of the core. The core and the clad are housed in, for example, a high-precision metal pipe, whereby the disposition of the core and the clad is fixed. The center position of the core can be highly accurately controlled. A sleeve is used for connection of two ferrules. The center positions of the cores of the respective two ferrules can be highly accurately set close to each other. Ideally, the center positions of the cores of both of the two ferrules are matched.

In the embodiment, the ferrule is used for optical joining to the optical conversion element rather than connecting the optical fibers. In the first optical element section according to the embodiment, the first optical system optically joins the optical conversion element and one end of the ferrule. The condensing lens 27 condenses an optical signal emitted from the LD 26A and makes the optical signal incident on one end (the left end shown in FIG. 4) of the ferrule 25. That is, the condensing lens 27 aligns light emitted from the LD 26A with the ferrule 25. As a result, the condensing lens 27 is disposed in a position where the ferrule 25 and the LD 26A are optically adjusted. The optical signal made incident from the one end of the ferrule 25 is propagated through the core inside the ferrule 25 and emitted from the other end (the right end shown in FIG. 4; the distal end). The distal end (a portion indicated by P in FIG. 4) of the ferrule 25 is a portion from which the optical signal is emitted. The distal end of the ferrule 25 is in contact with and joined to a joining part of the setting section 21 of the optical MUX module 15A.

In the embodiment, the ferrules of the plurality of first optical element sections have common structure and have an common outer diameter dimension within a predetermined accuracy range. Similarly, in the plurality of joining sections of the second optical element section, portions fitting with the ferrules have common structure and have an common outer diameter dimension within a predetermined accuracy range. Consequently, the plurality of first optical element sections can be connected to all of the plurality of joining sections of the second optical element section.

Figure 5:
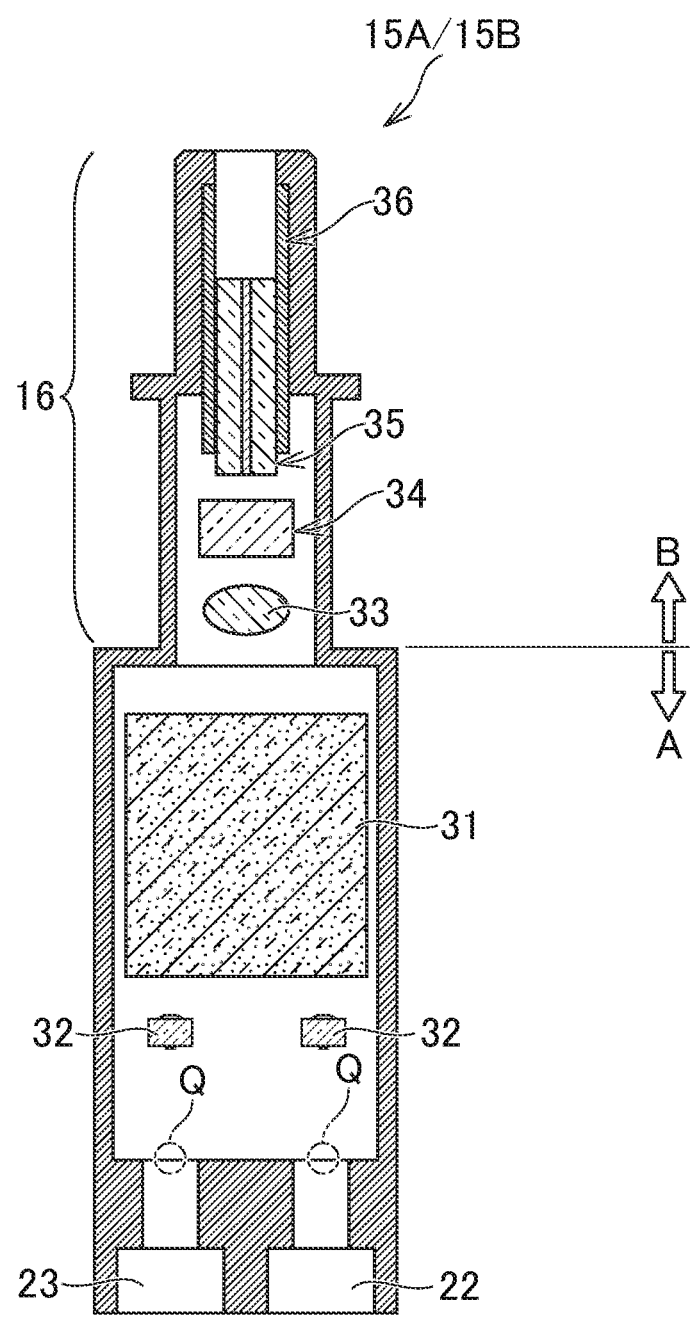
FIG. 5 is a schematic sectional view showing the structure of an optical MUX module/an optical DeMUX module according to the first embodiment of the present invention.

FIG. 5 is a schematic sectional view showing the structure of the optical MUX module 15A/an optical DeMUX module 15B according to the embodiment. For easy understanding of a sectional structure, concerning a main part of the optical MUX module 15A/the optical DeMUX module 15B, a cross section indicated by a VA-VA line in FIG. 3 is shown. Concerning the sleeve assembly 16, a cross section indicated by a VB-VB line in FIG. 3 is shown. That is, the cross section indicated by the VA-VA line is a cross section that pierces through the center in the longitudinal direction of the LD modules 12A and 13A (or the PD modules 12B and 13B) arranged in the lateral direction. The cross section pierces through the center in the longitudinal direction of the setting sections 22 and 23. The cross section indicated by the VB-VB line is a cross section that pierces through the center in the longitudinal direction of the sleeve assembly 16. The optical MUX module 15A is explained below.

As shown in FIG. 3, the plurality of first optical element sections according to the embodiment are four first optical element sections. The plurality of joining sections of the second optical element section are four joining sections. It is desirable to use the optical module 1 according to the embodiment for a four-channel WDM application such as CFP2 or CFP4. The four joining sections are arranged two by two. It is desirable that the four joining sections are arranged in a 2×2 square lattice shape. By disposing the four joining sections in this way, it is possible to package the four first optical element sections at high density. The plurality of first optical element sections are housed in the plurality of joining sections of the second optical element section. The joining section is fitted with the ferrule of the first optical element section. In the joining section, a portion with which the ferrule of the first optical element section is fit is highly accurately machined. Since such a portion and the external shape of the ferrule are highly accurately formed, when the plurality of first optical element sections are housed in the second optical element section, the center positions of the cores at the distal ends of the ferrules of the first optical element sections are controlled to be within a desired range.

The plurality of first optical element sections are mounted on the second optical element section such that the distal ends (a portion indicated by P in FIG. 3) of the ferrules 25 of the first optical element sections shown in FIG. 4 are in contact with the joining parts (portions indicated by Q in FIG. 5) of the plurality of joining sections of the second optical element section shown in FIG. 5, respectively.

The second optical element section further includes a wavelength multiplexing optical element and a plurality of second optical systems. The wavelength multiplexing optical element is optically joined to the optical conversion elements of the plurality of first optical element sections. The wavelength multiplexing optical element is, here, an optical multiplexer/demultiplexer 31. The optical multiplexer/demultiplexer 31 is used as a multiplexing mechanism that multiplexes a plurality of optical signals made incident from the plurality of joining sections and having wavelength different from one another and outputs a wavelength multiplexed optical signal. The optical multiplexer/demultiplexer 31 multiplexes optical signals emitted by the four LD modules 11A, 12A, 13A, and 14A from the distal ends of the ferrules 25 thereof and emits the wavelength multiplexed optical signal. Each of the plurality of second optical systems is disposed in a position where the wavelength multiplexing optical element and the joining part of the corresponding joining section are optically adjusted. The plurality of second optical systems are disposed in order to optically join the wavelength multiplexing optical element and the joining parts of the plurality of joining sections. The respective plurality of second optical systems are, here, lenses 32 that collimate the optical signals emitted by the four LD modules 11A, 12A, 13A, and 14A from the distal ends of the ferrules 25 thereof (i.e., optical signals emitted from the joining parts of the setting sections) and make the optical signals incident on (guide the optical signals to) the optical multiplexer/demultiplexer 31. In a simple configuration, the second optical system can be realized by one convex lens. By configuring the second optical system with the one convex lens, a reduction in the size of the second optical element section is realized. The lens 32 aligns the optical signal emitted from the joining part of the setting section with the optical multiplexer/demultiplexer 31. As a result, the lens 32 is disposed in a position where the joining part of the setting section and the optical multiplexer/demultiplexer 31 are optically adjusted. The second optical system is desirably a collimator lens that collimates the optical signal but is not limited to this. A desirable optical component only has to be selected as appropriate according to the configuration of the optical multiplexer/demultiplexer 31. For example, the second optical system may be a convex lens that suppresses dispersion of or condenses the optical signal emitted from the distal end of the ferrule 25 (the optical signal emitted from the joining part of the setting section). As in the embodiment, it is desirable from the viewpoint of a reduction in size that the second optical system is simply realized by one lens. However, the second optical system is not limited to this and may further include a plurality of optical components such as a mirror.

The second optical element section further includes a connection terminal optically joined to an optical fiber on the outside and the like. The connection terminal is, here, the sleeve assembly 16. The sleeve assembly 16 includes a condensing lens 33, an optical isolator 34, an optical fiber stub 35, and a sleeve 36. The condensing lens 33 condenses a wavelength multiplexed optical signal emitted from the optical multiplexer/demultiplexer 31 and propagated through an optical waveguide and makes the wavelength multiplexed optical signal incident on one end (the lower end shown in FIG. 5) of the optical fiber stub 35. That is, the condensing lens 33 optically joins the optical multiplexer/demultiplexer 31 and the one end of the optical fiber stub 35. Note that the optical fiber stub 35 is called in this way because the optical fiber stub 35 is housed in the sleeve 36. However, the structure of the optical fiber stub 35 is the same as the structure of the ferrule 25. The optical isolator 34 suppresses return light of the light emitted from the optical transmitter module 2A. The sleeve 36 is, for example, a split sleeve and connects the optical fiber stub 35 and a ferrule disposed at one end of the optical fiber 101A on the outside.

Main characteristics of the optical module according to the embodiment reside in that each of the plurality of first optical element sections includes the ferrule, the second optical element section includes the plurality of joining sections, and the distal ends of the plurality of ferrules and the joining parts of the plurality of joining sections of the second optical element section are respectively set in contact and joined. Consequently, it is possible to align the first optical element sections and the second optical element section independently from each other. It is possible to easily perform the alignment. Further, it is possible to realize simplification of a manufacturing process of the optical module, a reduction in a work time, and a reduction in cost. The respective plurality of first optical element sections are optically aligned such that the optical conversion elements and the ferrules are optically joined by the first optical system. The second optical element section is optically aligned such that the joining parts of the respective plurality of joining sections and the wavelength multiplexing optical element are optically joined by the second optical system corresponding to the second optical element section.

The alignment of the second optical element section can be performed independently from the first optical element section. Therefore, the first optical element section may be used or other optical elements may be used for the alignment of the second optical element section. If an optical element used for the alignment of the second optical element section is an optical device for alignment (a second optical device for alignment explained below), the optical device for alignment may be the first optical element section or may be other optical elements.

The optical device for alignment includes, for example, a ferrule having structure common to the ferrule of the first optical element section, an optical fiber connected to the ferrule, and a light source (a light emitting element). The external shape of the ferrule is highly accurately formed to be close to (ideally, coincide with) the external shape of the ferrule of the first optical element section. Like the first optical element, the ferrule is fit and housed in the joining section. The light source only has to be a light source that emits light having a wavelength of the optical signal of the first optical element section. The light source is, for example, a fixed wavelength light source. The second optical element section can be aligned using other optical elements (optical devices for alignment) different from the first optical element section.

In the TOSA 30 of the optical module 1 described in JP 2013-232514 A, when there is a deficiency in a part of the four optical subassemblies, for example, an optical mask characteristic, which is a characteristic necessary for the optical module 1, is not satisfied, the part of the optical subassemblies is replaced. However, when a replacing optical subassembly is set on the TOSA base 31, alignment needs to be performed again. This causes an increase in time of assembly work and an increase in cost. On the other hand, in the optical module according to the embodiment, the plurality of first optical element sections and the second optical element section can be formed as optical coupling systems that can be independent from each other. Therefore, when the plurality of first optical element sections are housed in the second optical element section and the optical module is used (or before the optical module is used), even if there is a deficiency in a part (e.g., one first optical element section) among the plurality of first optical element sections, only the relevant first optical element section has to be replaced. That is, in the replacement, when the relevant first optical element section is mounted on the second optical element section, new alignment is unnecessary. The optical module according to the embodiment achieves a conspicuous effect.

As shown in FIG. 5, in the optical transmitter module 2A according to the embodiment, the optical isolator 34 is disposed in the sleeve assembly 16. The optical isolator 34 is disposed between the condensing lens 33 and the optical fiber stub 35. However, the optical isolator 34 is not limited to this disposition and may be disposed further on the optical multiplexer/demultiplexer side than the lens. Further, as long as the optical isolator 34 is disposed on the inside of the optical MUX module 15A, the optical isolator 34 does not have to be disposed in the sleeve assembly 16. Optical isolators may be further respectively disposed in the respective LD modules 11A, 12A, 13A, and 14A. As long as the optical isolators are respectively disposed in the LD modules 11A, 12A, 13A, and 14A, the optical isolator 34 does not have to be disposed in the optical MUX module 15A. If reflection resistance of the LDs of the LD modules is sufficient, the optical isolator does not have to be used.

In the above explanation, the optical module 1 includes the optical transmitter module 2A including the plurality of first optical element sections and the second optical element section. In the following explanation, the optical module 1 includes the optical receiver module 2B including a plurality of first optical element sections and a second optical element section. In the optical receiver module 2B, the optical conversion elements of the first optical element sections are changed from the light emitting elements (the LD modules) to light receiving elements and the second optical element section (the optical MUX module 15A) is replaced with the DeMUX module 15B (DeMUX: Demultiplexer) including an optical demultiplexing function. Note that the light receiving element is an element that converts an optical signal into an electric signal. In the optical receiver module 2B according to the embodiment, the plurality of first optical element sections are four PD modules 11B, 12B, 13B, and 14B (PD: Photodiode). For example, the four PD modules 11B, 12B, 13B, and 14B respectively receive optical signals having light wavelengths in four wavelength bands, i.e., a 1271 nm band, a 1291 nm band, a 1311 nm band, and a 1331 nm band. The optical DeMUX module 15B includes a plurality of joining sections. The plurality of joining sections are four setting sections 21, 22, 23 and 24 in contact with and joined to, in joining parts, the distal ends of the ferrules 25 of the four PD modules 11B, 12B, 13B, and 14B, respectively. The setting sections include a function of holding and fixing the PD modules.

As shown in FIG. 4, the light receiving element included in the PD module 11B is a PD 26B. Note that the light receiving element is not limited to the PD and may be other elements such as an APD (Avalanche Photodiode) element. An optical signal made incident on the distal end (the right end shown in FIG. 4; the other end) of the ferule 25 is propagated through the core inside the ferrule 25 and emitted from the other end (the left end shown in FIG. 4; one end). The condensing lens 27 condenses the optical signal emitted from the ferrule 25 and makes the optical signal incident on the PD 26B. That is, the condensing lens 27 aligns light emitted from the ferrule 25 with the PD 26B. As a result, the condensing lens 27 is disposed in a position where the ferrule 25 and the PD 26B are optically adjusted. The distal end (the portion indicated by P in FIG. 4) of the ferrule 25 is a portion that receives the optical signal. The distal end of the ferrule 25 is in contact with and jointed to a joining part of the setting section 21 of the optical DeMUX module 15B.

In the optical DeMUX module 15B according to the embodiment, the optical isolator 34 is unnecessary. Therefore, the optical DeMUX module 15B has structure same as the structure of the optical MUX module 15A except that the optical isolator 34 is not disposed. That is, in the optical DeMUX module 15B, the optical isolator 34 is deleted from the structure shown in FIG. 5. The optical multiplexer/demultiplexer 31 is used as a demultiplexing mechanism that demultiplexes a wavelength multiplexed optical signal input from the outside and outputs a plurality of optical signals having wavelengths different from one another. The optical fiber 101B on the outside is connected to the sleeve 36. The optical multiplexer/demultiplexer 31 demultiplexes the wavelength multiplexed optical signal input from the outside and emits the wavelength multiplexed optical signal to the lens 32. The respective plurality of second optical systems (the lenses 32) collect the optical signal emitted from the optical multiplexer/demultiplexer 31 and make the optical signal incident on the distal end (the joining part of the setting section) of the ferrule 25. The lens 32 aligns the optical signal emitted from the optical multiplexer/demultiplexer 31 with the joining part of the setting section corresponding to the lens 32. As a result, the lens 32 is disposed in a position where the joining part of the setting section and the optical multiplexer/demultiplexer 31 are optically adjusted.

The sleeve assembly 16 includes the condensing lens 33, the optical fiber stub 35, and the sleeve 36. As explained above, usually, an optical isolator is unnecessary. The condensing lens 33 condenses a wavelength multiplexed optical signal emitted from one end (the lower end shown in FIG. 5) of the optical fiber stub 35 and makes the wavelength multiplexed optical signal incident on the optical multiplexer/demultiplexer 31. The optical receiver module 2B is explained above. The optical module according to the embodiment includes both of the optical transmitter module 2A including the plurality of first optical element sections and the second optical element section and the optical receiver module 2B including the plurality of first optical element sections and the second optical element section. However, the optical module may include one of the light transmitter module 2A and the light receiver module 2B.

A method of aligning the optical module 1 according to the embodiment is explained. Main characteristics of the method of aligning the optical module according to the embodiment reside in that the method includes a first-optical-element-section aligning step for aligning one first optical element section among a plurality of first optical element sections and a second-optical-element-section aligning step for aligning a second optical element section. The first-optical-element-section aligning step can be executed independently from the second-optical-element-section aligning step. The plurality of first optical element sections are aligned by the first-optical-element-section aligning step, respectively. The first-optical-element-section aligning step and the second-optical-element-section aligning step are present independently from each other. Therefore, it is possible to easily align the optical module 1.

First of all, a method of aligning the first optical element section (the first-optical-element-section aligning step) is explained. First, the first optical element section and a first optical device for alignment for aligning the first optical element section are prepared. When the optical conversion element of the first optical element section is a light emitting element, the first optical device for alignment includes a light receiving element. When the optical conversion element of the first optical element section is the light receiving element, the first optical device for alignment includes the light emitting element. The first optical device for alignment includes a first connection terminal in contact with and joined to the distal end of the ferrule of the first optical element section. The first optical device for alignment includes, for example, a first ferrule having structure common to the ferrule of the first optical element section, an optical fiber connected to the first ferrule, a first sleeve for connecting the first ferrule and the ferrule of the first optical element section, and an optical element (a light emitting element or a light receiving element). The first sleeve fits with the first ferrule and the ferule of the first optical element section and optically joins the first ferrule and the ferrule of the first optical element section.

Second, the first optical device for alignment is connected to the first optical element section. The first optical element section and the first optical device for alignment are driven. Note that one or both of the optical conversion element of the first optical element section and the first optical system are not completely fixed and can be moved for alignment. When the optical conversion element of the first optical element section is a light emitting element, the optical conversion element emits light and the light receiving element of the first optical device for alignment receives the light. When the optical conversion element of the first optical element section is a light receiving element, a light emitting element of the first optical device for alignment emits light. An optical conversion element of the first optical element section receives the light.

Third, a position (s) of one or both of the optical conversion element and the first optical system is adjusted. When the optical conversion element of the first optical element section is the light emitting element, the position (s) of one or both of the optical conversion element and the first optical system is adjusted to set a light reception signal of the light receiving element of the first optical device for alignment to a desired value, desirably, a maximum. Of the optical conversion element and the first optical system, the position of an element (or an optical component included in the element) that can be moved for alignment is moved. When the optical conversion element of the first optical element section is the light receiving element, the position(s) of one or both of the optical conversion element and the first optical system is adjusted to set a light reception signal of the optical conversion element to a desired value, desirably, a maximum.

Fourth, the optical conversion element and the first optical system are fixed. Of the optical conversion element and the first optical system, the position of the element (or the optical component included in the element) that can be moved for alignment is fixed. Consequently, the first optical system can be disposed in a position where the ferrule and the optical conversion element are optically adjusted. All of the plurality of first optical element sections can be aligned by executing the first-optical-element-section aligning step on the plurality of first optical element sections, respectively.

A method of aligning the second optical element section (a step for aligning the respective second optical element sections) is explained. First, the second optical element section and a second optical device for alignment and a third optical device for alignment for aligning the second optical element section are prepared. The second optical device for alignment includes a second connection terminal in contact with and joined to one joining section among a plurality of joining sections of the second optical element section. The second connection terminal can be in contact with and joined to a contact part of a joining section corresponding to the second connection terminal. The plurality of joining sections have common structure. Therefore, the second connection terminal desirably can be in contact with and joined to joining parts of all of the plurality of joining sections. The third optical device for alignment includes a third connection terminal in contact with and joined to a connection terminal (the sleeve assembly 16) of the second optical element section. When the wavelength multiplexing optical element of the second optical element section can also be used as a multiplexing mechanism and as a demultiplexing mechanism like the optical multiplexer/demultiplexer 31, it is possible to select a simple aligning method irrespective of whether the second optical element section is the optical MUX module 15A or the optical DeMUX module 15B. The second connection terminal of the second optical device for alignment is a second ferrule having structure common to the ferrule of the first optical element section. For example, the second optical device for alignment includes the second ferrule, an optical fiber connected to the second ferrule, and a light source (a light emitting element). The third connection terminal of the third optical device for alignment is a third ferrule in contact with and joined to the connection terminal (the sleeve assembly 16) of the second optical element section. The third connection terminal is fit with the sleeve 36 of the sleeve assembly 16 and optically joined to the optical fiber stub 35. For example, the third optical device for alignment includes the third ferrule, an optical fiber connected to the third ferrule, and a light receiving element.

Note that, when the wavelength multiplexing optical element of the second optical element section only has the demultiplexing function, the second optical device for alignment only has to include the light receiving element and the third optical device for alignment only has to include the light emitting element. In any case, the light emitting element (the light source) included in one of the second optical device for alignment and the third optical device for alignment only has to be a light source that emits light having a wavelength of the optical signal of the first optical element section and is, for example, a fixed wavelength light source.

Second, the second optical device for alignment is connected to any one of the plurality of joining sections of the second optical element section, the third optical device for alignment is connected to the connection terminal of the second optical element section, and the second optical element section, the second optical device for alignment, and the third optical device for alignment are driven. Note that one or both of the second optical system of the second optical element section and the wavelength multiplexing optical element are not completely fixed and can be moved for alignment. The light emitting element (the light source) included in one of the second optical device for alignment and the third optical device for alignment emits light having a wavelength corresponding to the light emitting element. The light receiving element included in the other receives the light.

Third, a position(s) of one or both of the second optical system and the wavelength multiplexing optical element is adjusted. The second optical system is one second optical system corresponding to the joining section to be connected among the plurality of second optical systems. The position (s) of one or both of the second optical system and the wavelength multiplexing optical element is adjusted to set a light reception signal of the light receiving element of the other of the second optical device for alignment and the third optical device for alignment to a desired value, desirably, a maximum. Of the second optical system and the wavelength multiplexing optical element, the position of an element (or an optical component included in the element) that can be moved for alignment is moved. The wavelength multiplexing optical element includes a plurality of optical components such as mirrors, lenses (collimator lenses), and filters in order to multiplex or demultiplex an input optical signal. The positions of the optical components are adjusted.

The second optical device for alignment is connected to any one of the plurality of joining sections of the second optical element section. The position(s) of one or both of the second optical system and the wavelength multiplexing optical element is adjusted. This is repeated for all of the plurality of joining sections in order. When alignment of the wavelength multiplexing optical element itself is already completed, only relative positions of the wavelength multiplexing optical element and the plurality of second optical systems only have to be adjusted. When the alignment of the wavelength multiplexing optical element itself is not already completed, the positions of the plurality of optical components of the wavelength multiplexing optical element are also adjusted.

Fourth, the second optical system and the wavelength multiplexing optical element are fixed. The position of the element that can be moved for alignment is fixed. Consequently, the second optical systems can be disposed in positions where the wavelength multiplexing optical element and the joining part corresponding to the wavelength multiplexing optical element are optically adjusted.

The method for aligning the optical module 1 according to the embodiment is explained above. By disposing the first optical system in the position where the ferrule and the optical conversion element are optically adjusted according to the aligning method, it is possible to manufacture the first optical element section. Similarly, by disposing the respective plurality of second optical systems in the positions where the wavelength multiplexing optical element and the joining parts corresponding to the wavelength multiplexing optical element are optically adjusted, it is possible to manufacture the second optical element section. Therefore, it is possible to manufacture the optical module according to the embodiment.

Second Embodiment

Figure 6:
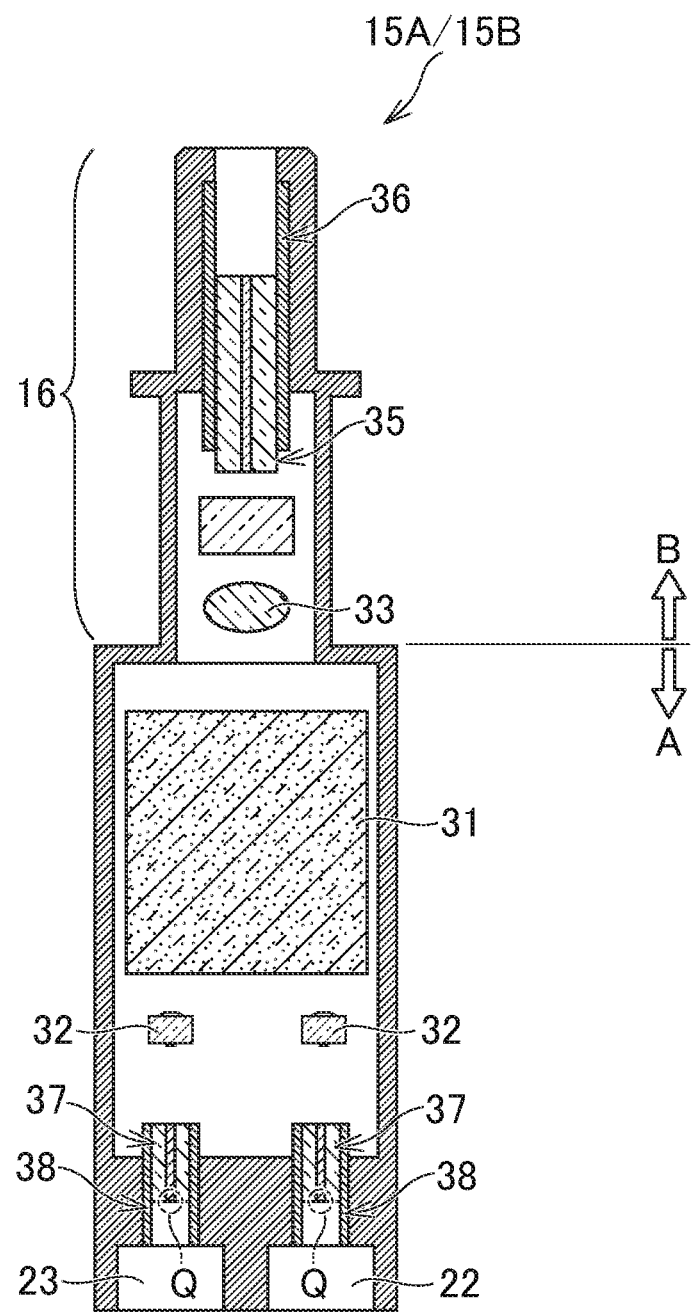
FIG. 6 is a schematic sectional view showing the structure of an optical MUX module/an optical DeMUX module according to a second embodiment of the present invention.

FIG. 6 is a schematic sectional view showing the structure of the optical MUX module 15A/the optical DeMUX module 15B according to a second embodiment of the present invention. The optical module 1 according to the embodiment is the same as the optical module 1 in the first embodiment except that the structure of the plurality of joining sections of the second optical element section is different. As shown in FIG. 6, the plurality of joining sections (e.g., the setting sections 22 and 23) include sleeve mechanisms for optically combining the joining sections with the ferrule of the first optical element section. The sleeve mechanism includes an optical fiber stub 37 and a sleeve 38. One end (the lower end shown in FIG. 6; a portion indicated by Q) of the optical fiber stub 37 is optically joined to be in contact with the distal end (the portion indicated by P in FIG. 3) of the ferrule of the first optical element section. The sleeve 38 is, for example, a split sleeve. When the plurality of first optical element sections are housed in the second optical element section, the center position of the core present at the distal end of the ferrule of the first optical element section and the center position of a core present at the one end of the optical fiber stub 37 can be controlled to be highly accurately brought close to each other. Ideally, the center positions of both of the cores can be matched. Consequently, it is possible to more highly accurately optically join the ferrule of the first optical element section and the joining section of the second optical element section.

The optical modules according to the embodiments of the present invention are explained above. The present invention is not limited to the embodiments and can be widely applied to optical modules for the WDM application. That is, the LD is explained as the example of the optical conversion element of the first optical element section at the time when the optical conversion element is the light emitting element. However, the present invention is not limited to this and can be applied to all of light emitting elements used in the WDM application. Similarly, the PD and the APD element are explained as the examples of the optical conversion element at the time when the optical conversion element is the light receiving element. However, the present invention is not limited to this and can be applied to all of light receiving elements used in the WDM application. The optical multiplexer/demultiplexer is explained as the example of the wavelength multiplexing optical element of the second optical element section. However, the present invention is not limited to this and can be applied to all of wavelength multiplexing optical elements used in the WDM application. The sleeve assembly is explained as the example of the connection terminal of the second optical element section. However, the present invention is not limited to this and can be widely applied to connection terminals for connection to an optical fiber on the outside.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
   a plurality of first optical element sections; and
   a second optical element section optically joined to the plurality of first optical element sections,
   each of the plurality of first optical element sections comprising:

an optical conversion element converting one of an optical signal and an electric signal into the other;
a ferrule, having a first end and a second end, the second end being in contact with and optically joined to the second optical element section; and
a first optical system disposed in a position where the ferrule and the optical conversion element are optically adjusted, the first optical system condensing the optical signal emitted from an end of the optical conversion element into the first end of the ferrule in a case that the optical conversion element converts the electric signal into the optical signal and condensing the optical signal emitted from the first end of the ferrule into the end of the optical conversion element in a case that the optical conversion element converts the optical signal to the electric signal, and the second optical element section comprising:
a plurality of joining sections, each being in contact with and joined to, in a joining part, the second end of the ferrule of the corresponding first optical element section;
a wavelength multiplexing/demultiplexing optical element optically joined to the optical conversion elements of the plurality of first optical element sections; and
a plurality of second optical systems, each disposed in a position where the wavelength multiplexing/demultiplexing optical element and the joining part of the corresponding joining section are optically adjusted, and collimating the optical signal emitted from the corresponding joining section into the wavelength multiplexing/demultiplexing optical element in the case that the optical conversion element converts the electric signal into the optical signal and condensing the optical signal collimated and emitted from the wavelength multiplexing/demultiplexing optical element into the corresponding joining section in the case that the optical conversion element converts the optical signal into the electric signal, wherein each of the plurality of joining sections is prevented from being in contact with an optical fiber which optically combines the corresponding ferrule with the wavelength multiplexing/demultiplexing optical element, and wherein the plurality of joining sections are arranged in a same plane substantially perpendicular to the optical signal of each of the plurality of first optical element sections.

2. The optical module according to claim 1, wherein the optical conversion elements of the respective plurality of first optical element sections are light emitting elements which are each configured to convert the electric signal into the optical signal.

3. The optical module according to claim 1, wherein the optical conversion elements of the respective plurality of first optical element sections are light receiving elements which are each configured to convert the optical signal into the electric signal.

4. The optical module according to claim 1, wherein each of the plurality of second optical systems of the second optical element section comprises a convex lens.

5. The optical module according to claim 1, wherein the plurality of first optical element sections comprise four first optical element sections, and
the plurality of joining sections of the second optical element section comprise four joining sections.

6. The optical module according to claim 5, wherein the four joining sections are arranged two by two.

7. The optical module according to claim 1, wherein each of the plurality of joining sections includes a sleeve mechanism configured to be optically combined with the second end of the ferrule of the corresponding first optical element section, wherein the sleeve mechanism of each of the plurality of joining sections includes an optical fiber stub having a first end and a second end, and a sleeve controlling a center position of the second end of the ferrule at each of the plurality of the first optical element sections and a center position of the first end of the corresponding optical fiber stub to be brought close to each other, wherein the first end of the optical fiber stub of each of the plurality of joining sections is in contact with and optically joined to the second end of the ferrule of the corresponding first optical element section, and the second end of the optical fiber stub is prevented from being contact with the optical fiber, and wherein the optical signal emitted from the other end of the optical fiber stub of each of the plurality of joining sections enters into the corresponding second optical system in the case the optical conversion element converts the electric signal into the optical signal and the optical signal emitted from the corresponding second optical system into the other end of the optical fiber stub in the case the optical conversion element converts the optical signal into the electric signal.

8. The optical module according to claim 1, wherein the second optical element section further comprises an optical fiber stub arranged on an opposite side of the wavelength multiplexing/demultiplexing optical element from the plurality of joining sections.

9. A method for aligning an optical module including:
a plurality of first optical element sections; and
a second optical element section optically joined to the respective plurality of first optical element sections,
each of the plurality of first optical element sections comprising:
an optical conversion element that converts one of an optical signal and an electric signal into the other;
a ferrule, having a first end and a second end, the second end being in contact with and optically joined to the second optical element section; and
a first optical system for optically joining the ferrule and the optical conversion element, the first optical system condensing the optical signal emitted from an end of the optical conversion element into the first end of the ferrule in a case that the optical conversion element converts the electric signal into the optical signal and condensing the optical signal emitted from the first end of the ferrule into the end of the optical conversion element in a case the optical conversion element converts the optical signal to the electric signal, and the second optical element section comprising:
a plurality of joining sections, each being in contact with and joined to, in a joining part, the second end of the ferrule of the corresponding first optical element section;
a wavelength multiplexing/demultiplexing optical element optically joined to the optical conversion elements of the plurality of first optical element sections; and
a plurality of second optical systems, each for optically joining the wavelength multiplexing/demultiplexing optical element and the joining part of the corresponding joining section, and collimating the optical signal emitted from the corresponding joining section into the wavelength multiplexing/demultiplexing optical element in the case that the optical conversion element converts the electric signal into the optical signal and condensing the optical signal collimated and emitted from the wavelength multiplexing/demultiplexing optical element into the corresponding joining section in the case that the optical conversion element converts the optical signal into the electric signal, the method comprising:

a first-optical-element-section aligning step for aligning one first optical element section among the plurality of first optical element sections; and a second-optical-element-section aligning step for aligning the second optical element section, the first-optical-element-section aligning step comprising:
  connecting, to the one first optical element section, a first optical device for alignment comprising a first connection terminal in contact with and joined to the second end of the ferrule of the one first optical element section; and
  adjusting a position of at least one of the optical conversion element of the one first optical element section and the first optical system, and the second-optical-element-section aligning step comprising:
  connecting, to one joining section among the plurality of joining sections of the second optical element section, a second optical device for alignment comprising a second connection terminal in contact with and joined to the one joining section; and
  adjusting a position of at least one of one second optical system corresponding to the one joining section among the plurality of second optical systems and the wavelength multiplexing/demultiplexing optical element, wherein each of the plurality of joining sections is prevented from being in contact with an optical fiber which optically combines the corresponding ferrule with the wavelength multiplexing/demultiplexing optical element, and wherein the plurality of joining sections are arranged in a same plane substantially perpendicular to the optical signal of each of the plurality of first optical element sections.

10. The method for aligning the optical module according to claim 9, wherein the second optical element section further comprises an optical fiber stub arranged on an opposite side of the wavelength multiplexing/demultiplexing optical element from the plurality of joining sections.

\* \* \* \* \*